United States Patent
Fabi Moreira

(10) Patent No.: US 11,874,368 B2
(45) Date of Patent: Jan. 16, 2024

(54) CHARTING AND SURVEILLANCE RADAR

(71) Applicant: T-JUMP TECNOLOGIAS LTDA, Valinhos (BR)

(72) Inventor: Laila Fabi Moreira, Valinhos (BR)

(73) Assignee: T-JUMP TECNOLOGIAS LTDA, Valinhos (BR)

( * ) Notice: Subject to any disclaimer, the term of this patent is extended or adjusted under 35 U.S.C. 154(b) by 266 days.

(21) Appl. No.: 17/428,190

(22) PCT Filed: Dec. 30, 2018

(86) PCT No.: PCT/BR2018/050491
§ 371 (c)(1),
(2) Date: Aug. 3, 2021

(87) PCT Pub. No.: WO2020/140141
PCT Pub. Date: Jul. 9, 2020

(65) Prior Publication Data
US 2022/0120891 A1      Apr. 21, 2022

(51) Int. Cl.
*G01S 13/90*     (2006.01)

(52) U.S. Cl.
CPC ...... *G01S 13/9023* (2013.01); *G01S 13/9076* (2019.05)

(58) Field of Classification Search
CPC .. G01S 13/89; G01S 13/9021; G01S 13/9023; G01S 13/9076; G01S 13/882; G01S 13/935
See application file for complete search history.

(56) References Cited

U.S. PATENT DOCUMENTS

| | | | | |
|---|---|---|---|---|
| 4,978,960 A * | 12/1990 | Newcomb | ............... | G01S 13/89 342/25 C |
| 5,196,854 A * | 3/1993 | Mathews | ................ | G01S 13/89 342/26 B |
| 5,886,662 A * | 3/1999 | Johnson | .............. | G01S 13/9027 342/197 |
| 5,898,399 A * | 4/1999 | Carrara | ............... | G01S 13/9054 342/25 A |
| 6,650,274 B1 * | 11/2003 | Krikorian | ............... | G01S 13/89 342/25 R |
| 7,109,911 B1 * | 9/2006 | Cataldo | .................... | G01S 13/90 342/25 R |
| 10,056,001 B1 * | 8/2018 | Harris | ..................... | G06V 10/56 |
| 11,035,931 B1 * | 6/2021 | Kipp | ..................... | G01S 13/935 |
| 11,525,910 B2 * | 12/2022 | Fox | ......................... | G01S 7/025 |

(Continued)

FOREIGN PATENT DOCUMENTS

BR       0105049 B1    11/2017
CN       102147462 A    8/2011
(Continued)

OTHER PUBLICATIONS

International Search Report dated Sep. 11, 2019 in corresponding International application No. PCT/BR2018/050491; 5 pages.
(Continued)

*Primary Examiner* — Peter M Bythrow
(74) *Attorney, Agent, or Firm* — Maier & Maier, PLLC

(57) ABSTRACT

A millimeter wavelength charting synthetic aperture radar having small dimensions and light weight, carried by an UAV (unmanned aerial vehicle), also referred to as a drone.

9 Claims, 3 Drawing Sheets

(56) References Cited

U.S. PATENT DOCUMENTS

| | | | |
|---|---|---|---|
| 2003/0132874 A1* | 7/2003 | Krikorian | G01S 13/524 342/25 R |
| 2003/0189512 A1* | 10/2003 | Chen | G01S 13/5244 342/107 |
| 2004/0090360 A1* | 5/2004 | Vincent | G01V 3/17 342/25 C |
| 2004/0178952 A1* | 9/2004 | Jenkins | G01S 13/26 342/134 |
| 2009/0179790 A1* | 7/2009 | Jahangir | G01S 15/8904 342/25 B |
| 2010/0225531 A1* | 9/2010 | Johnson | G01S 17/89 342/25 A |
| 2011/0299733 A1* | 12/2011 | Jahangir | G01S 13/9029 382/103 |
| 2016/0061949 A1* | 3/2016 | Mohamadi | H01Q 1/28 342/21 |
| 2018/0335518 A1* | 11/2018 | Fox | G01S 7/025 |
| 2018/0356516 A1* | 12/2018 | Fox | G01S 7/006 |
| 2020/0142055 A1* | 5/2020 | Fox | G01S 13/9011 |
| 2020/0142056 A1* | 5/2020 | Fox | G01S 13/90 |
| 2020/0348412 A1* | 11/2020 | Durham | H01Q 21/28 |
| 2021/0041556 A1* | 2/2021 | Fox | G01S 13/9052 |

FOREIGN PATENT DOCUMENTS

| | | |
|---|---|---|
| CN | 104991250 A | 10/2015 |
| JP | H1078481 A | 3/1998 |

OTHER PUBLICATIONS

International Preliminary Report on Patentability dated Jun. 16, 2021 in corresponding International Application No. PCT/BR2018/050491; 15 pgs.

* cited by examiner

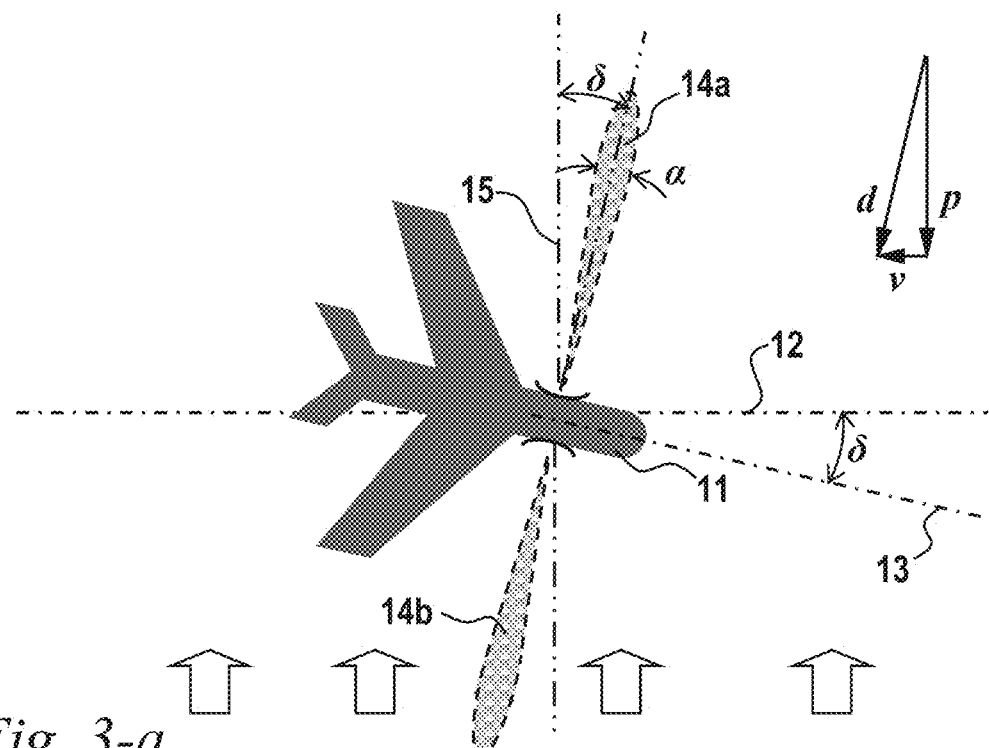
*Fig. 3-a*
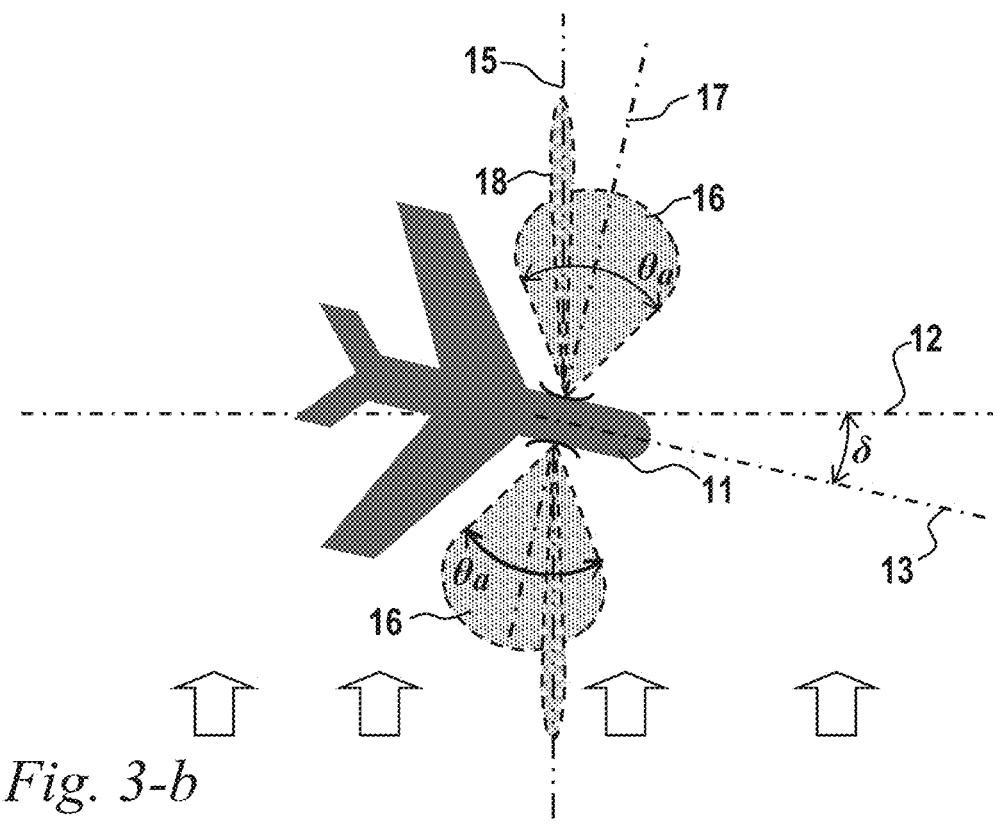
*Fig. 3-b*

CHARTING AND SURVEILLANCE RADAR

The instant invention concerns a millimeter wavelength charting synthetic aperture radar having small dimensions and light weight, carried by an UAV (unmanned aerial vehicle) also referred to as a drone.

BACKGROUND

With the rapid development of technologies related to unmanned aerial vehicles, their use for mapping has become an important technique for charting. Currently, mapping methods comprise the following key technologies:

Satellite charting, using cameras or radars, capable of producing topographic maps up to a scale of 1:25,000, i.e., up to a planimetric accuracy of approximately 2.5 m. In case cameras are used, the image obtained is two-dimensional, and it is not possible to obtain accurate information related to the relief for the scale of 1:25000. In addition, camera use is limited to favorable weather conditions, i.e. absence of clouds, fog or rain.

Charting by means of radars carried by aircraft, as disclosed in Brazilian patent document PI0105049-2 titled "Method for Producing Maps by Radar Technique". The technology therein described provides data with greater accuracy than satellites, due to the fact that the aircraft flies much closer to the ground, allowing topographic calculations with greater precision and providing a higher image resolution than satellite surveys. In addition, the use of radars is not hampered by adverse atmospheric conditions. Further advantages are the greater available power than with satellites, and greater capacity to acquire raw data. Compared to satellite charting, which is of medium precision, of large scale production and medium cost, the charting provided by aircraft is of high precision, of low scale production and of high cost.

However, the need for complex infrastructure and exacting preparation results in high cost, which is why mapped areas cannot be small, making such surveys economically viable only for areas with hundreds or even thousands of square kilometers, depending on the scale.

Current techniques are not economically feasible for performing aerial surveys of small areas, for example, in the range of 1 to 1000 square kilometers at the higher-detail scales, for example 1:5,000, but also in the range of 1 to 10,000 square kilometers at the lower-precision scales, such as 1:50,000.

SUMMARY

In view of the above, it is a goal of the invention to provide a radar with map-making precision that may reach the scale 1:5.000 in low-cost surveys.

Another object is to provide a radar that allows to determine a digital surface model with accuracy of up to 10 cm and terrain surface with accuracy of up to 1 meter.

The above mentioned objects, as well as others, are achieved by providing a radar system using the synthetic aperture interferometric SAR technique, having small size and light weight carried by a drone (UAV), operating at a pulse repetition rate (PRF) of at least 100 kHz and with peak power of the order of hundreds of mW.

According to another feature of the invention the raw data provided by the antennas are processed on board in real time, said processing comprising the reduction of PRF from the order of hundreds of kHz to values of the order of hundreds of Hz or a few kHz, with a corresponding reduction of the data rate from hundreds of Mbytes/s to a few Mbytes/s.

According to another feature of the invention, said processing comprises the addition in a single pulse of the raw data corresponding to a plurality of pulses.

According to another feature of the invention, said addition pulse comprises the data of at least a hundred pulses.

According to another feature of the invention, suitable illumination of the terrain even in the presence of drone instabilities during flight is ensured by making the beamwidth of the emitting and receiving antennas' lobes substantially larger than those normally employed on airborne or satellite radars.

According to another feature of the invention the compensation of the drone's yaw is provided by the use of lobes with a beamwidth of up to 70° in azimuth.

According to another feature of the invention, the lobe beamwidth of the antennas employed to determine the elevation is up to 50% larger than the one employed in conventional airborne systems.

According to another feature of the invention, the selection of return signals in the desired direction, that is, the direction perpendicular to the flight path is provided by filtering those signals in which the Doppler shift is close to zero, i.e., 0 Hz Doppler frequency shift.

According to another feature of the invention the selection of signals in which the Doppler effect is small and the bandwidth is equal to or less than 150 Hz, said band being centered on Doppler-Zero, is provided by leading the return signals through the circuit that makes said addition, which is equivalent to a low pass filter with a band pass centering in the transmitted signal frequency and a 150 Hz bandwidth.

According to another feature of the invention, the angular instabilities of the drone are also compensated by said sum, where the beam of orthogonal signals to the flight line, characterized by the Doppler-Zero effect (i.e., whose frequency is little modified by the Doppler effect up to close to ±80 Hz) is always illuminated by the antenna, due to the large amplitude of the respective radiation lobe.

According to another feature of the invention, the angular instabilities of the drone are also compensated by said addition, where the beam of signals at right angle to the flight path—characterized by a zero Doppler-shift (i.e., whose frequency is little modified by the Doppler effect up to near ±80 Hz)—is always illuminated by the antenna, due to the large width of the respective radiation lobe. Said addition effectively reduces the PRF from hundreds of kHz to hundreds or a few thousand Hz.

According to another feature of the invention, the compensation of the drone oscillations is provided by the addition of the amplitudes of the raw data corresponding to a plurality of return signals (said addition being effectively equivalent to the reduction of PRF).

According to another feature of the invention, the height of the drone above ground is 10 to 500 meters.

According to another feature of the invention, said radar system operates in one or more of the C, L, P, X and S bands.

According to another feature of the invention, the process of determination of the surface model uses two antennas operating in the C-band, vertically arranged, the spacing between them forming a baseline for said determination by means of interferometry.

According to another feature of the invention, the process of determining the terrain model uses two antennas operating in the P-band, vertically or horizontally arranged, the spacing between them forming a baseline for said determination by means of interferometry.

According to another feature of the invention, the determination of the vegetation cover uses two antennas operating in the L band, one of which operates with horizontal polarization and the other with vertical polarization, operating with VV, VH, HH and HV polarizations, where the first letter denotes reception polarization and the second letter refers to transmission polarization.

BRIEF DESCRIPTION OF THE DRAWINGS

Further features and advantages of the invention will become more evident by describing an exemplary embodiment thereof, the drawings of which are the following:

FIG. 3-a illustrates the behavior of azimuth radar signals in a fixed-wing drone subjected to side wind.

FIG. 3-b illustrates the behavior of azimuth radar signals in a fixed-wing drone subjected to side wind.

DETAILED DESCRIPTION OF THE EMBODIMENTS

The proposed exemplary system uses a remotely piloted class 3 drone (UAV) with a maximum total weight of 25 kg. In this aircraft are installed two radars laterally aimed to the left and to the right, whose line of sight is orthogonal to the longitudinal axis of the aircraft.

The flight heights above ground are preferably as follows:
120 m (400 ft) for higher precision cartography, i.e. on scales 1:500 to 1:5000;
180 m (600 ft) for high/medium precision cartography, i.e. on scales from 1:10,000 to 1:25,000;
450 m (1500 ft) for medium precision cartography, i.e. up to the scale of 1:50,000.

The C-band, with frequencies of the order of 5 GHz, is used to survey the surface model, i.e. the canopy of vegetation. The P-band, with frequencies of around 400 MHz, allows scanning the terrain surface under the vegetation. The L band, with frequencies of the order of 1 to 2 GHz allows to classify the vegetation.

Figure 1:
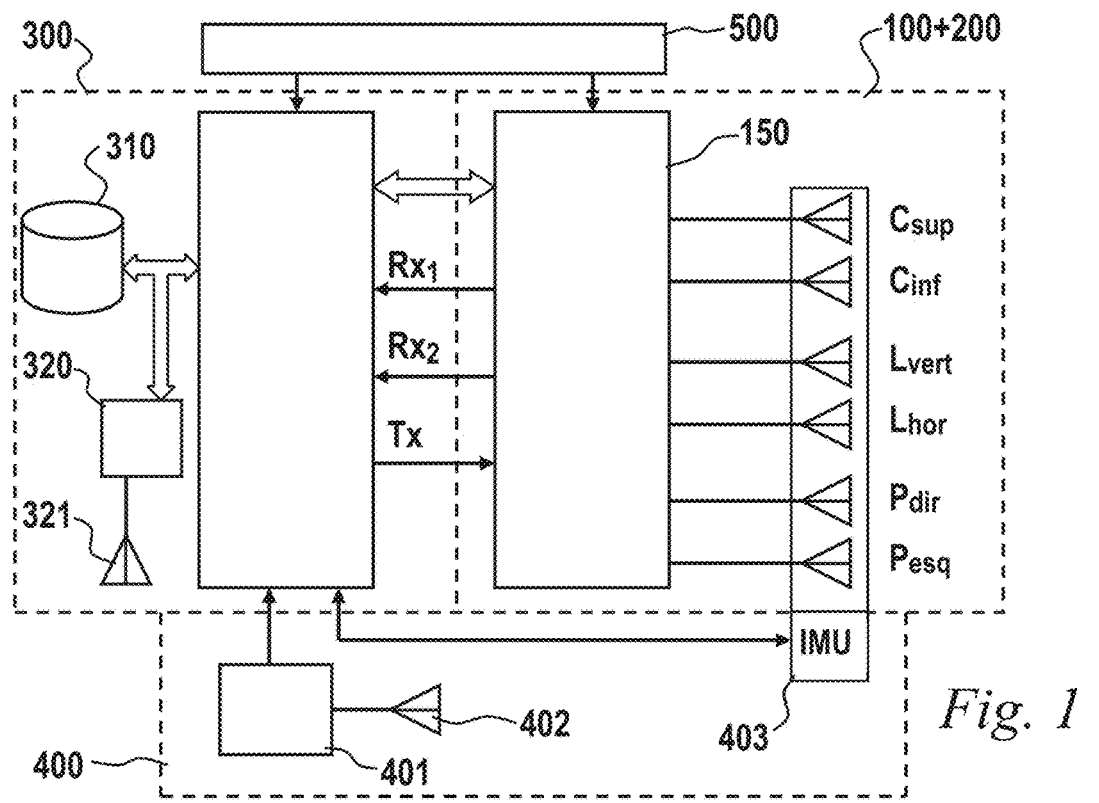
FIG. 1 is a simplified block diagram of the invention's radar system.

FIG. 1 is a simplified block diagram of the proposed system, which comprises an analog part and a digital part. The analog part comprises the antennas as well as the radio frequency subsystem, identified in the drawing as block 150. In said exemplary embodiment, the antennas are as follows: 4 antennas for operation in the C band, two for each side (one Tx/Rx and another Rx), a pair of antennas for operation in the L band and a pair of antennas for operation in the P band, wherein a specific circuitry is associated with each set of antennas.

Still according to the invention, an inertial platform 403 is also provided, i.e., an Inertial Measurement Unit (IMU), which measures accelerations and rotations on the 3 axes. The data provided by this platform is stored in a solid state memory. Together with the GPS receiver 401 and its 402 antenna, it forms the 400 navigation sensor ensemble.

The digital part 300 generates the Tx transmission digital signal; The analog signals received by each of the antennas of each pair, represented in the diagramby Rx1 and Rx2 are digitized and subjected to a treatment in which there is a significant reduction in the data rate, simultaneously with compensation of instabilities and oscillations of the drone orientation during flight. The resulting data are either recorded in solid state memory 310 or transmitted via RF 320 transceiver and its 321 antenna to ground control, ensuring the integrity of the collected data in the event of a possible drone accident. Additionally, this digital part coordinates the operation of the circuits as well as the operation of the drone.

Figure 2:
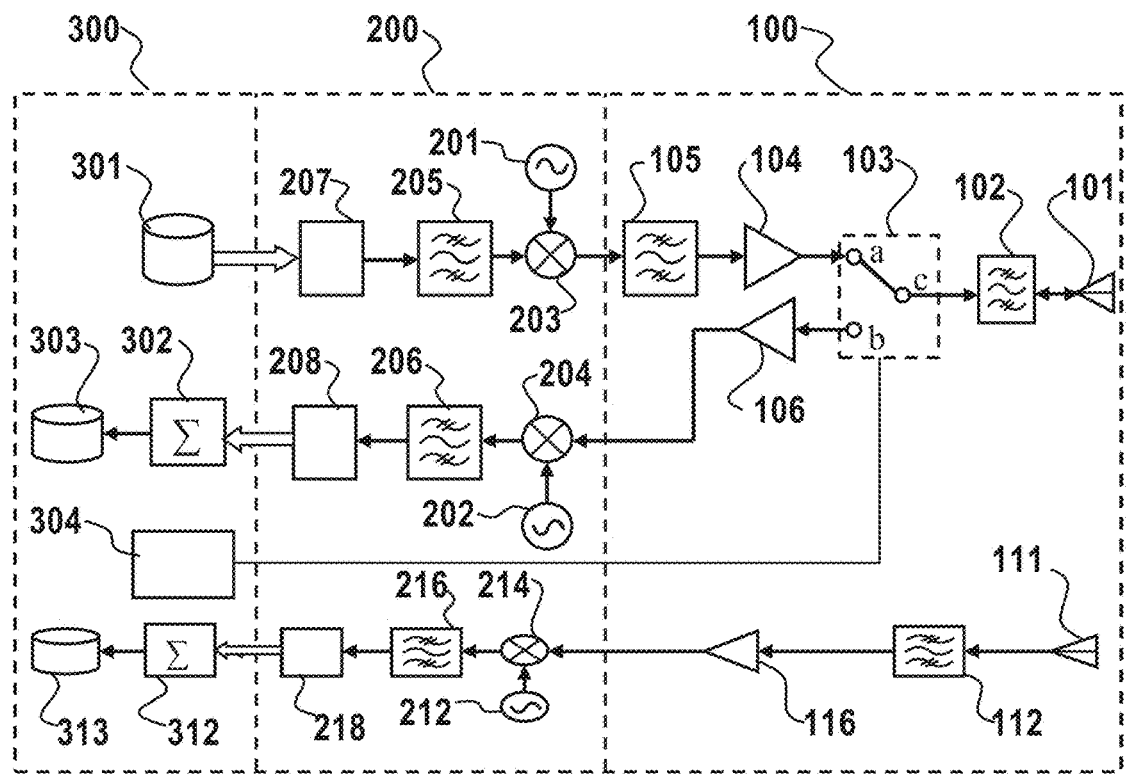
FIG. 2 is a detailed block diagram of one of the radar bands.

FIG. 2 shows the block diagram of one of the radar bands, as detailed below:

a) the signal to be transmitted, previously recorded in solid state memory 301 is forwarded to the digital-analog converter D/A 207, which generates the corresponding analog signal;

b) said analog signal passes through the filter 205 that eliminates the spurious conversion signals, and is forwarded to the mixer 203, where, through the beating with the frequency of oscillator 201, it is transposed to the radar frequency, i.e., band C, L or P, as the case may be;

c) after filtering by filter 105 to eliminate the unwanted products of this conversion, the signal in the band of interest is amplified to the desired power by amplifier 104 and forwarded, through switch 103, to the first antenna 101 of the pair of antennas used for operation in each of the bands C, L or P;

d) switch 103 allows the use of a single antenna 101 for two functions: with the moving contact in position a, the antenna transmits the signal amplified by amplifier 104;

e) with the moving contact in position b, the antenna receives the return signal (echo) of the radar, which is filtered by the pass-band filter 102, in order to eliminate noise and interference outside the radar reception band either C, L or P as well as the signal component frequency-shifted by the Doppler effect;

f) once filtered and amplified by amplifier 106, the return signal has its frequency reduced by means of beating, in mixer 204, with a CW signal produced by the local oscillator 202;

g) after filtering by filter 206, the conversion into a digital signal is performed by the A/D 208 converter;

h) said digitized signal is then subjected to a treatment in the summing circuit 302 that compensates for the effects of the drone oscillations during flight, also providing the reduction of the repetition rate of the raw data, as will be described in detail further below;

i) the return signal received by the second antenna 111 of the pair is subjected to the treatment defined in the steps (e) to (g) above, and the data obtained at the output of the summing circuit 312 is stored in solid state memory 313, as well as the data provided by the summing stage 302 corresponding to the first channel are stored in memory 303.

Besides being recorded in the above mentioned memories, the data acquired by radar can be transmitted to a ground control by means of a radiofrequency link.

The means used in the invention to compensate for irregularities in the orientation of the aircraft during flight will now be described in detail.

Preferably, the invention uses fixed antennas, thus not requiring a pointing stabilization device. In the case of the C band, for example, the antenna is part of the physical support means of the electronic circuits, i.e. the printed circuit board, in the form of a patch antenna.

FIG. 3-a illustrates a fixed-wing drone 11 on whose sides are installed two antennas that transmit and receive beams 14 having a lobe width angle α the typical value of which is of the order of 8°, said beams being oriented perpendicularly to the longitudinal axis 13 of the aircraft. In case crosswinds affect the drone, they tend to divert the aircraft from the scheduled flight line 12, making the ground processing of the signals extremely complex and time-consuming, significantly increasing costs. To compensate this tendency, the automatic flight control system engages the rudder in order to introduce a deviation δ so that the effective path of the drone coincides with the flight line 12.

In addition, the cross-wind intensity may vary, a fact often observed in the surface winds and at the operating height of the drone: in this case, the variability of the wind will require a continuous variation of the yaw angle δ, resulting in a continuous oscillation in the pointing direction of the beams 14, compromising the reliability of the data collected by the radar.

Such shortcoming means that the currently known systems can only operate in favorable weather conditions, i.e. with little or no wind, substantially reducing the number of usable days to perform the mappings. Otherwise, processing becomes time-consuming and complex.

The present invention comprises means that allow to carry out surveys regardless of atmospheric conditions, reducing to a minimum the amount of unfavorable days. Such means comprise a widening in azimuth of the radiation lobe of the antenna, complemented by the computational treatment given to the information collected by it.

As exemplified in FIG. 3-b, the broadened horizontal beam lobe 16 encompasses an $\theta_a$ angle about 70° wide, which allows to accommodate within it, in addition to the direction 17 corresponding to the axis of the lobe 16, the lobe 18, perpendicular to the line of flight 12, even in the case of large values of the yaw angle δ.

However, the broadening of the lobe 16 brings about the reception of echo radar signals corresponding to a wide angular range, instead of the required narrow beam. Thus, it becomes necessary to separate, among the echoes coming from the multiplicity of angles covered by the lobe 16, those echoes of interest, that is, those coming from the direction 15 perpendicular to the flight line.

The separation of echoes of interest from all other echoes relies upon the property of electromagnetic signals to have their frequency modified by the Doppler effect, brought about by the fact that, in case of the unwanted echoes, there exists a propagation component of these signals in the direction parallel to that of the flight line. Thus, for example, and according to the detailed vector diagram in FIG. 3-a, the direction d of propagation of the signals 14 is the sum of two orthogonal components of direction, the first one p perpendicular to flight path 12 and the second one v, parallel to the same path.

It is therefore evident that the Doppler effect on radar signals due to said second component v will be all the more pronounced the greater the angle that the direction of signal's propagation makes with the perpendicular to path 12. It follows that the signals that propagate in direction 15, perpendicular to the flight line and where the component v=0, will not have their frequency shifted by the Doppler effect, which, however, will influence the frequencies of the signals that propagate in all other directions.

Therefore, a first filtering of the radar echoes is performed by the 102 and 112 pass-band filters, which are responsible for filtering thermal noise, interference and allowing the passage of the return signal within the radar working band, which is around 400 MHz for the C band, 175 MHz for the L band and 100 Mhz for the P band.

The selection of radar echoes corresponding to direction 15 is made by means of the adder circuits 302 and 312, eliminating all signals with frequencies outside the Doppler band.

Figure 4:
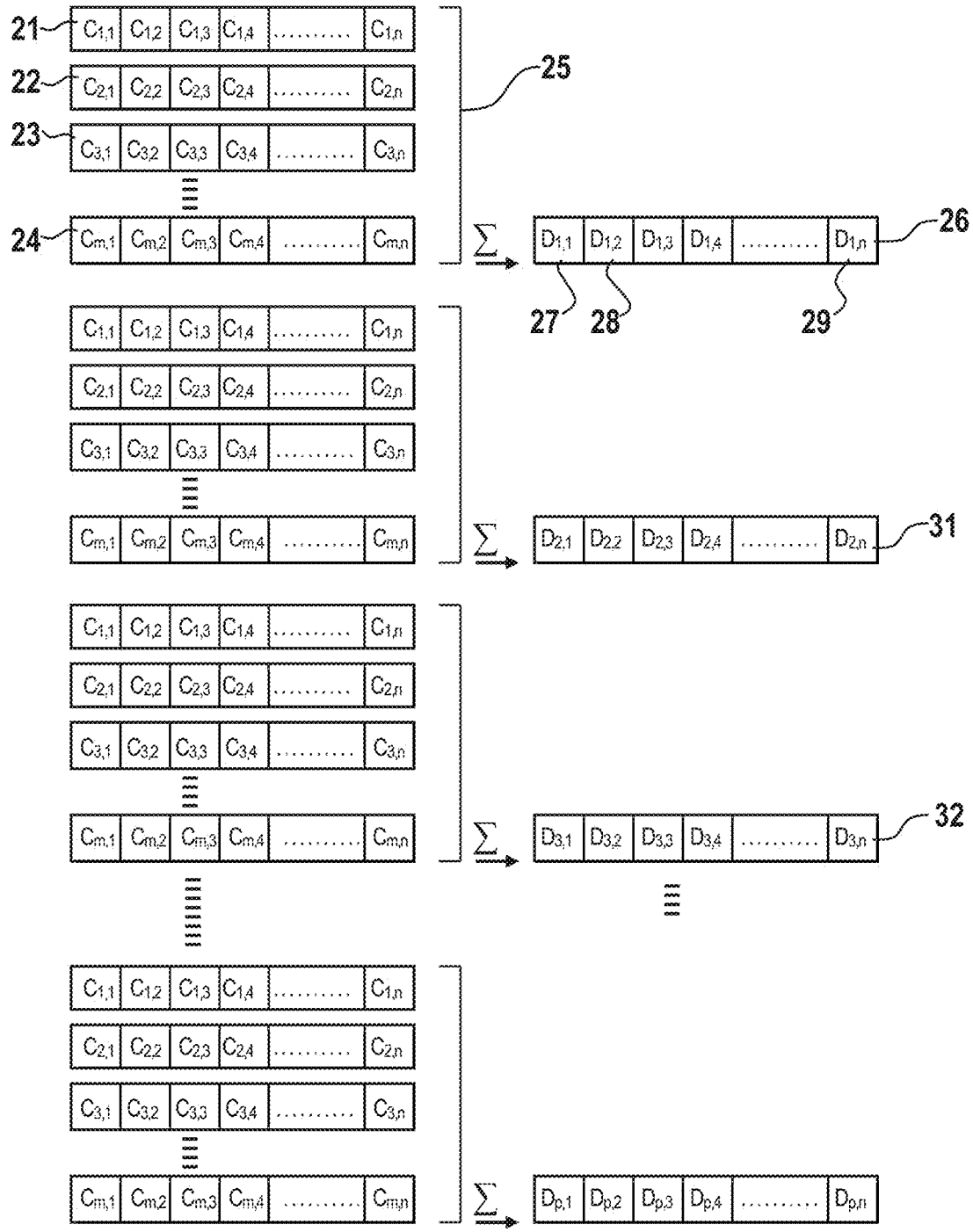
FIG. 4 summarizes the operation of the adding circuit in order to reduce PRF.

The second stage of the treatment of radar return signals occurs in blocks 302 and 312 (see FIG. 2), and results in a substantial reduction in the data rate. This stage is summarized in FIG. 4 where 21, 22, 23 . . . 24 indicate each of the radar signal return lines. Each row is formed by n range cells: cell $C_{1,1}$ is the one closest to the radar and cell $C_{1,n}$ is the more distant one. In the second row, cell $C_{2,1}$ is closest to the radar, and cell $C_{2,n}$ is the farthest, and so on.

The addition is performed separately for each range cell, i.e. the first range cell of each row is summed with the first range cell of the second, third, fourth, fourth rows, and so on, up to the first range cell of the $m^{th}$ row that together are comprised in block 25, resulting in the first cell of the first output line 26 of the adder circuit, that is:

$$C_{1,1}+C_{2,1}+C_{3,1}+\ldots C_{m,1}=D_{1,1}$$

The following cells of the first line of the output of the summation block 302 or 312 are attained in a similar way:

$$C_{1,2}+C_{2,2}+C_{3,2}+\ldots C_{m,2}=D_{1,2}$$

. . .

$$C_{1,n}+C_{2,n}+C_{3,n}+\ldots C_{m,n}=D_{1,n}$$

Due to the width of the $\theta_a$ lobe, the system operates with a high pulse repetition rate (PRF), of the order of hundreds of kHz, which generates a high data rate, since each pulse corresponds to n cells. So, for example, in the case of PRF=225 kHz and n=1000, the data rate is in the order of 4000 kBytes/s. In case the data contained in each cell comprises 1 byte of 8 bits (resolution of 256 levels) the rate will be 1.8 Gbits/sec.

Adopting a reduction factor of, for instance, m=1500, the pulse repetition frequency reached at the output of said block will be in the order of some hundreds of Hz. Thus, adopting the above exemplary values, the pulse repetition rate drops to 150 kHz and the bit data rate becomes 1.2 Mbits/sec.

In order to further clarify the issue, some additional considerations regarding the treatment of radar return echo signals as well as the relevant formulas will be presented below.

The first of these formulas, below, relates azimuth resolution to drone speed and Doppler bandwidth:

$$\delta_a = V/B_a \qquad (I)$$

where $\delta_a$ is the azimuth resolution in meters;

V is the drone speed in meters per second;

$B_a$ is the Doppler bandwidth in Hz, necessary to provide the $\delta_a$ resolution, that is:

$$B_a = V/\delta_a \qquad (Ia)$$

The second formula relates the total Doppler bandwidth, the width of the antenna radiation lobe, the speed of the drone and the radar wavelength:

$$B_t = (2 \cdot V \cdot \theta_a)/\lambda \qquad (II)$$

where:

$B_t$ is the total Doppler bandwidth;

V is the drone speed in meters per second;

$\theta_a$ is the antenna lobe breadth in radians;

λ is the wavelength in meters.

The third formula relates the number of pulses m and the PRF with the stated bandwidth in the summing stage output:

$$B_s \text{ is } = PRF/m \quad \text{(III)}$$

where:
- $B_s$ is the bandwidth in Hz at the summing stage output;
- PRF is the pulse repetition frequency in Hz;
- m is the number of input pulses that is added to provide one output pulse.

Considering, for example, that the drone speed is 100 km/h, equivalent to 27.8 m/s and the desired resolution is 18.5 cm, equivalent to 0.185 metres, the formula (I) provides:

$$B_a = 27.8/0.185 = 150 \text{ Hz}$$

To make sure that the total Doppler band $B_t$ will be sufficient to accommodate the $B_a$ band, formula (II) is used by inserting the numerical values, namely:
- Drone speed 2.8 m/s
- Lobe angle 1.23 radians
- Wavelength (considering C band) 5.5 cm=0.055 meter Resulting in $$B_t = (2 \cdot 27{,}8 \cdot 1{,}23)/0{,}055 = 1243 \text{ Hz}$$

It is therefore verified that the Doppler 1243 Hz bandwidth of $B_t$ antenna is substantially larger than the 150 Hz $B_a$ bandwidth which is required to obtain an azimuth resolution of 18.5 cm. Consequently, the antenna pointing direction is not critical, since even in the case of small deviations, the required Doppler $B_a$ bandwidth of 150 Hz will be included within the $B_t$ bandwidth of the antenna.

To attain a high average power using a low transmission peak power, the radar should operate with a high PRF. In the case of a 225 kHz PRF, a Doppler band of up to 225 kHz can be sampled, wherein the signal is represented in complex form, that is, with a real part and an imaginary part.

From equation (II) it is known that the Doppler $B_t$ bandwidth of the radar is approximately 1200 Hz and by the equation (I) that the Doppler required bandwidth is only 150 Hz. Thus, the PRF value can be adjusted to obtain the $B_a$ bandwidth, which is the one required to provide an azimuth resolution of 18.5 cm. Considering said $B_a$ value and a PRF of 225 kHz, equation (III) provides a value of m=1500.

It is important to highlight that only the summation stages 302/312 can reduce the Doppler band. The 102/112 input filters do not have the ability to filter so narrowly, since they are centered at 5 GHz.

After the treatment of signals by the summation stages 302 and 312, the resulting information is stored in solid state memories 303 and 313, such information being used for the preparation of maps. To this end, they can be processed in several ways, such as by the technique taught in Brazilian patent document PI0105049-2 entitled "Method for The Production of Maps by Radar Technique"; other techniques available in the market can also be used.

Controller stage 304 controls switch 103 and regulates the timing of all the blocks that make up the radar.

Although the invention has been described with reference to preferred exemplary embodiment, it is understood that modifications and changes are allowed, provided that they fall within the inventive concept herein disclosed. One such change refers to the use of a rotary-wing drone in place of the fixed-wing drone as shown in FIGS. 3-*a* and 3-*b*, in which the antennas are fixed on the sides of the body. In the rotary-wing drone, the antennas will be fixed at the lower part of the body, however this does not alter the principle and the working of the invention.

Accordingly, the invention is described and limited by the claims that follow.

The invention claimed is:

1. CHARTING AND SURVEILLANCE RADAR carried by an UAV (unmanned aerial vehicle) flying in a determined flight path, comprising operation using a synthetic aperture radar (SAR) interferometric technique, with a pulse repetition rate (PRF) of transmitted radar pulses in a range of 100 kHz to 225 kHz and with a peak power between 1 milliwatt and 1 watt, a yaw of the UAV being compensated by use of lobes with a beamwidth of up to 70° in azimuth, and a selection of backscattered signals in a direction perpendicular to a line of flight of the UAV being provided by filtering the backscattered signals;
   wherein a Doppler shift between frequencies of emitted signals and the backscattered signals falls within a 150 Hz bandwidth centered in Doppler-zero;
   wherein each backscattered signal pulse comprises a plurality of n data cells in the time domain, with a first cell being closest to a radar antenna of the UAV and an nth cell being farthest from the radar antenna; and
   wherein data that are recorded in solid state mass memories comprise output lines from adder circuits, each output line including n cells, a first cell of a first output line being a sum of first range cells of the backscattered signal pulses, and so on for the second, third and further recorded output lines, thereby reducing a data rate of the recorded data.

2. CHARTING AND SURVEILLANCE RADAR as claimed in claim 1, wherein a flight altitude of the UAV above the ground is approximately 120 meters for cartography on scales from 1:500 to 1:1500, approximately 180 meters for cartography on scales from 1:10,000 to 1:25,000 and approximately 450 meters for cartography up to the scale of 1:50,000.

3. CHARTING AND SURVEILLANCE RADAR as claimed in claim 1, wherein said sum of the data of cells in a same range is carried out in summing circuits for a plurality of transmitted pulses, said cells being sampled in the time domain, wherein the number of said plurality of pulses is a function of speed of the UAV and the PRF of the radar.

4. CHARTING AND SURVEILLANCE RADAR as claimed in claim 1, further comprising antennas operating in one or more of the C, L or P bands;
   wherein the antennas are fixed and the antenna operating in the C-band is a patch antenna provided as part of a physical support means of radar electronic circuits.

5. CHARTING AND SURVEILLANCE RADAR as claimed in claim 1, wherein the data stored in solid state mass memories are derived from manipulation of the backscattered signals received from a substantially orthogonal direction to the flight path said signals being within a 150 Hz bandwidth centered in Doppler-zero, wherein signals from other directions, falling outside said bandwidth, are eliminated.

6. CHARTING AND SURVEILLANCE RADAR as claimed in claim 1, wherein data resulting from a sum of data from a plurality of return pulses are recorded in a solid state memory.

7. CHARTING AND SURVEILLANCE RADAR as claimed in claim 1, wherein data resulting from a sum of data from a plurality of return pulses are transmitted in real time to a ground control.

8. CHARTING AND SURVEILLANCE RADAR as claimed in claim 1, wherein the radar transmits and receives in one or more of the C, L, P, X and S bands.

9. CHARTING AND SURVEILLANCE RADAR as claimed in claim 1, wherein a determination of a surface model is made by C-band interferometry, and a determination of a terrain model is made by P-band interferometry.

\* \* \* \* \*